United States Patent [19]

Norton

[11] Patent Number: 5,591,725
[45] Date of Patent: Jan. 7, 1997

[54] WATER-IN-OIL DISPERSION

[75] Inventor: Ian T. Norton, Rushden, United Kingdom

[73] Assignee: Van den Bergh Foods Co., Division of Conopco, Inc., Lisle, Ill.

[21] Appl. No.: 494,606

[22] Filed: Jun. 23, 1995

Related U.S. Application Data

[63] Continuation of Ser. No. 87,361, Jul. 2, 1993, abandoned, which is a continuation of Ser. No. 756,028, Sep. 6, 1991, abandoned.

[30]  Foreign Application Priority Data

Sep. 7, 1990 [EP] European Pat. Off. ............... 90309791

[51] Int. Cl.⁶ ............................. A01N 43/04; A23D 7/00; A23K 1/00
[52] U.S. Cl. ........................ 514/58; 514/937; 426/601; 426/609; 426/615
[58] Field of Search ................. 514/58, 937; 426/603, 426/609, 615, 33, 601

[56]  References Cited

U.S. PATENT DOCUMENTS

| | | | |
|---|---|---|---|
| 4,103,037 | 7/1978 | Bodor et al. | 426/657 |
| 4,143,171 | 3/1979 | Buckley et al. | 426/574 |
| 4,305,970 | 12/1981 | Moran et al. | 426/603 |
| 4,389,426 | 6/1983 | Reissmann et al. | 426/602 |
| 4,400,405 | 8/1983 | Morley et al. | 426/604 |
| 4,536,411 | 8/1985 | Kirton et al. | 426/604 |
| 4,555,411 | 11/1985 | Moran et al. | 426/603 |
| 4,591,507 | 5/1986 | Bodor et al. | 426/604 |
| 4,882,187 | 11/1989 | Izzo et al. | 426/602 |
| 4,956,193 | 9/1990 | Cain et al. | 426/573 |
| 5,194,285 | 3/1993 | Norton | 426/603 |
| 5,217,742 | 6/1993 | Jones et al. | 426/603 |
| 5,223,300 | 6/1993 | Brinkers et al. | 426/603 |
| 5,252,352 | 10/1993 | Banach et al. | 426/603 |
| 5,279,844 | 1/1994 | Wesdorp et al. | 426/603 |
| 5,338,560 | 8/1994 | Wesdorp et al. | 426/603 |

FOREIGN PATENT DOCUMENTS

| | | |
|---|---|---|
| 1057571 | 7/1979 | Canada . |
| 237120 | 9/1987 | European Pat. Off. . |
| 279499 | 8/1988 | European Pat. Off. . |
| 293980 | 12/1988 | European Pat. Off. . |
| 297690 | 1/1989 | European Pat. Off. . |
| 369550 | 5/1990 | European Pat. Off. . |
| 473854 | 3/1992 | European Pat. Off. . |
| 474299 | 3/1992 | European Pat. Off. . |
| 2084171 | 4/1982 | United Kingdom . |

*Primary Examiner*—John Kight
*Assistant Examiner*—Louise N. Leary
*Attorney, Agent, or Firm*—A. Kate Huffman

[57]  ABSTRACT

The present invention is concerned with a plastic dispersion containing from 5–65 wt. % of a continuous fat phase and from 95–35 wt. % of a gelling polysaccharide containing dispersed aqueous phase, wherein the gelling polysaccharide is selected from the group consisting of agar, pectin and mixtures thereof and present in a concentration exceeding the critical concentration and which aqueous phase contains further 0.004 to 10.0 wt. % of protein.

We have found that the present dispersion displays essentially the same in-mouth break down behaviour as a gelatin based dispersion.

6 Claims, No Drawings

WATER-IN-OIL DISPERSION

This is a continuation application of Ser. No. 08/087,361, filed Jul. 2, 1993, now abandoned, which was a continuation of Ser. No. 07/756,028, filed Sep. 6, 1991, now abandoned.

The present invention relates to a plastic dispersion containing from 5–65 wt. % of a continuous fat phase and from 95–35 wt. % of a gelling polysaccharide containing dispersed aqueous phase.

Dispersions of the above type, such as fat spreads, are well known in the art. Examples of gelling polysaccharides used in such dispersions are: carrageenan, modified starches, alginate. It is also known in the art to use gelatin to gel the aqueous phase rather than a gelling polysaccharide. Gelatin, as compared to gelling polysaccharides, generally offers the advantage that it melts at mouth temperature and that dispersions containing said gelling agent readily release salt as well as water soluble flavour components. The use of high melting gelling polysaccharides, such as agar and pectin, at above critical concentration level on the contrary produces a dispersion which exhibits a bad mouthfeel on account of the high melting point and because it breaks down in the mouth relatively slowly, i.e. does not quickly release salt and flavour compounds. Therefore pectin and agar have not become acceptable replacers for gelatin in fat spreads with a gelled aqueous phase.

In EP (A) 0 369 550 published May 23, 1990, a fat spread is described with a water phase gelled by a polysaccharide, particularly kappa-carrageenan. To improve the inherent bad properties of this high-melting gelling agent a relatively large amount of denatured heat-settable protein is added. In Research Disclosure 217, (May 1982), p. 133 a low fat spread is described in which the gelatin is replaced by high-methoxylated pectin. Because this type of pectin in the used concentrations does not form a gelled water phase, the above problem does not arise.

We have found now that a high-melting gelling polysaccharide containing dispersion displaying essentially the same mouthfeel and in-mouth break down behaviour as a gelatin based dispersion can be obtained by replacing gelatin by a gelling agent selected from the group consisting of agar, pectin and mixtures thereof, provided protein is included. Accordingly, the present invention is specifically concerned with a plastic dispersion containing from 5–65 wt. % of a continuous fat phase and from 95–35 wt. % of a gelling polysaccharide containing dispersed aqueous phase, wherein gelling polysaccharide is selected from the group consisting of agar, pectin and mixtures thereof, at a concentration exceeding the critical concentration thereof and from 0.01 to 10.0 wt. % of protein, preferably other than gelatin. Even protein concentrations lower than 0.01 wt %, until 0.004 wt % may be used.

The replacement of gelatin by the present gelling system offers several advantages. The gelling polysaccharide and protein can both be obtained from natural non-animal sources, as contrasted to gelatin which is extracted from pig skin. The latter explains why food products containing gelatin are unacceptable to large consumer groups such as vegetarians and people who only eat 'kosher' food.

The present gelling system offers the additional advantage that both agar and pectin are relatively insensitive to the ionic environment. In this respect agar is even preferred over pectin which is sensitive to $Ca^{2+}$ (with the exception of Ca-pectin). The above insensitivity of the present polysaccharides offers the advantage that the ionic composition of the aqueous phase and the saliva do not seriously influence the properties of the product.

The improved oral release observed for the present dispersion can suitably be demonstrated by recording the conductivity of the dispersion as a function of time in the mouth. The latter measurement can suitably be carried out by means of a dental plate provided with two electrodes. The test person is requested to masticate the product in order to mimic the in-mouth shear forces normally observed during consumption. When measuring the conductivity as a function of time in the mouth, generally a sigmoid curve is obtained, indicating that the conductivity rises with time. A product displaying a good oral response generally produces a relatively steep curve which arrives at its maximum quickly. Dispersions producing an adequate oral release generally reach 50% of the total conductivity increase within 30 seconds.

The synergistic interaction of the gelling polysaccharide and protein can suitably be illustrated by measuring the conductivity as a function of time for the product containing gelling polysaccharide and the product containing gelling polysaccharide and protein. The introduction of protein at a concentration level in accordance with the present invention results in a substantially more rapid conductivity increase. The latter conductivity increase is believed to be closely correlated to, for instance, the increase in salt and flavour release. It is interesting to notice that the inclusion of protein in gelatin-based dispersions does not substantially improve the break-down characteristics thereof.

The beneficial effect of the inclusion of protein is obtained already at surprisingly low concentration levels of protein. Therefore, in a preferred embodiment the aqueous phase contains less than 1.0 wt. % protein, more preferably less than 0.30 wt. % and most preferably less than 0.15 wt. %. According to another preferred embodiment the protein concentration exceeds 0.03% by weight of the aqueous phase. It is beneficial for the storage stability as well as for the spreading behaviour of the present type of dispersions that the effective amount of protein is found to be so low, because proteins are known for their destabilizing action.

The additional inclusion of a viscosity enhancer was found to be advantageous as a dispersion displaying a still better mouthfeel can thus be obtained. Examples of suitable viscosity enhancers are thickening agents, such as natural gums and non-gelling starches, and gelling agents applied below their critical concentration. Acording to a very preferred embodiment of the invention the viscosity enhancer is selected from the group consisting of guar gum, enzyme modified guar, maltodextrin, sodium alginate, xanthan gum, waxy starches (e.g. waxy rice starch), locust bean gum, tragacanth, cross-linked starches, particulate protein (e.g. Simplesse ™) and mixtures thereof.

It is to be understood that in the present gelling system the protein present therein can act as a viscosity enhancer. The present invention therefore encompasses, for instance, a dispersion wherein the aqueous phase comprises a gelling amount of gelling polysaccharide and, e.g., 9.0 wt. % of particulate protein.

The critical concentration of a gelling agent is the concentration level at which said gelling agent will start to form a gel. The critical concentration of the gelling polysaccharide(s) in the aqueous phase composition of the plastic dispersion is determined in an aqueous system which has exactly the same composition as the aqueous phase composition to be incorporated into the present dispersion, except that non-polysaccharide gelling agents are not included and on the understanding that the concentration of the gelling polysaccharide(s) has to be varied in order to establish the critical concentration thereof.

The critical concentration of a gelling polysaccharide or a mixture of gelling polysaccharides in a particular composition can be calculated from measurements of the shear modulus of a series of samples containing different concentrations of gelling polysaccharide or mixture of gelling polysaccharides, as described in Br. Polymer J. 17 (1985), 164. If the critical concentration of a combination of gelling polysaccharides is to be determined, then the critical concentration of such mixture of gelling polysaccharides is determined in a manner analogous to the procedure described above. The composition of the mixture of gelling polysaccharides is kept constant and the weight concentration of said mixture is varied as if it consisted of only one single gelling polysaccharide.

The critical concentration for gelling agents other than the gelling polysaccharide(s) present at above critical concentration is determined in essentially the same manner. In order to establish whether a gelling agent acts as a viscosity enhancer, the critical concentration for said gelling agent is measured in an aqueous phase system devoid of (other) gelling polysaccharides. It is to be understood, however, that the viscosity enhancer can suitably be a gelling polysaccharide which as such is present at a concentration below its critical concentration, but which in combination with another gelling polysaccharide is present at a concentration level exceeding the critical concentration of said combination.

The viscosity enhancer in the present dispersion is preferably present in an amount sufficient to raise the viscosity of the aqueous phase, in the absence of gelling agents, by at least 40 mPa.s at 35° C. and 100 $s^{-1}$. More preferably the viscosity is in the range of 60–4000 mPas. The viscosity can suitably be measured using a Haake TM viscometer.

Depending on the type of viscosity enhancer used, the adequate concentration level for said component can vary widely. Generally concentration levels in the range of 0.08 to 13.0% by weight of the aqueous phase are found suitable.

Although proteins of any source can suitably be used in the present dispersion, it is preferred that all gelatin be replaced, i.e. to have essentially no gelatin present. More preferably the protein in the present dispersion is selected from the group consisting of dairy protein, vegetable protein and mixtures thereof. Most preferably the protein is dairy protein. According to another preferred embodiment of the invention protein is included at a concentration in the range of 0.05 to 0.5 wt. %.

Examples of gelling agents which, in addition to agar and pectin, can suitably be included in the present dispersion are: kappa-carrageenan, iota-carrageenan, alginate, gellan, gelling starch, microcrystalline cellulose and mixtures thereof. As observed hereinbefore the present dispersion preferably comprises protein selected from the group consisting of dairy protein, vegetable protein (e.g. soya protein) and mixtures thereof. Thus, preferably, also gelling protein, when present, is selected from this group. Gelling agents other than polysaccharides according to a very preferred embodiment of the invention, if present, are included at a concentration below the critical concentration of said gelling agents.

We have found that particular good results are obtained when the present dispersion contains a gelling amount of agar. More preferably the present dispersion contains agar in an amount of 0.5% to 5% by weight of the aqueous phase. Examples of suitable commercially available agar products are: Gracaleria, Gelidium and agar/agar of food grade.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di-and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification the term 'polyol fatty acid polyester' is intended to refer to any such polyesters or mixtures thereof of which, on an average, more than 70% of the polyol hydroxyl groups have been esterified with fatty acids. In this specification by 'indigestible' is meant that at least about 70% by weight of the material concerned is not digested by the human body.

The fat phase of the present dispersion preferably contains a substantial amount of solid fat at 20° C., but only a very limited amount of solid fat at 35° C. The so called N-value of the fat phase is indicative of the solid fat content. The N-value for a fat at a certain temperature t is indicated as $N_t$ and indicates the equilibrium solid fat content of the composition at that temperature t, expressed in % of the weight of that composition. It can conveniently be measured by means of NMR, as described in Fette, Seifen, Anstrichmittel 80 (1978), 180–186. Preferably the $N_{20}$ of the present fat phase is in the range of 8–50%, whereas the $N_{35}$ ranges from 0–5%.

The benefits of the present invention are particularly appreciated in low fat spreads, i.e. spreads containing substantially less than the about 80% fat normally found in butter and margarine. The lower the fat content of the dispersion, the bigger the influence of the aqueous phase system becomes. Preferably the present dispersion contains less than 65 wt. % fat. Such dispersions of low fat content can suitably be divided into two classes: the low fat spreads containing from 28–65 wt. % fat and the very low fat spread containing from 5–28 wt. % fat.

As observed hereinbefore the present dispersion offers the advantage that a good oral response is obtained which is at least partially ascribed to the fact that the combined utilization of gelling polysaccharide and protein results in a quick break down of the dispersion in the mouth. A measure for the quickness of break down is the time needed to achieve 50% of the total conductivity increase observed when measuring the conductivity as a function of time in the mouth, using the method described hereinbefore. A good performance is when 50% of the conductivity increase is observed in 10–25 seconds.

The invention is illustrated by means of the following examples:

EXAMPLE 1

A 40% fat spread was prepared from an aqueous phase and fat phase of the following composition (in wt. %):

| Fat phase | |
| --- | --- |
| Fat blend [1] | 99.0 |
| Monoglycerides (Hymono 8903 ™) | 0.5 |
| Lecithin (Bolec ZTD ™) | 0.5 |
| Beta carotene | trace |
| Flavour | trace |

[1] Blend consisting of 80 wt. % sunflower oil and 20 wt. % soybean oil hardened to a slip melting point of 44° C.

| Aqueous phase | |
| --- | --- |
| Agar (1254 Gelidium ™) | 0.8 |
| Sodium caseinate | 0.1 |
| Sodium alginate (Mannucol DM ™) | 1.0 |
| Sodium chloride | 1.5 |
| Potassium sorbate | 0.15 |
| Water | 96.45 |
| pH to 5.3 with tactic acid | |

The fat phase and aqueous phase were separately prepared and maintained at 60° C. in separate vessels. From these vessels both phases were fed to a sequence of apparatus at a throughput of 50 g/minute and combined therein in a weight ratio of fat phase to aqueous phase of 40:60. The processing conditions applied were as follows:

| Unit | Jacket temperature (°C.) | Rotation speed (rpm) |
| --- | --- | --- |
| C-unit | 25 | 1000 |
| A-unit | 10 | 1000 |
| C-unit | 10 | 1400 |
| A-unit | 10 | 1000 |
| C-unit | 10 | 1000 |

As can be deduced from the above table both the C-units (crystallizers) and A-units (scraped surface heat exchangers) were provided with a cooling jacket.

The low fat spread obtained was found to have a good oral release and mouthfeel. The oral release and mouthfeel were very similar to those of a similar low fat spread containing 3% gelatin by weight of the aqueous phase. When the sodium caseinate is not included in the aqueous phase composition a low fat spread is obtained which displays a substantially worse oral response than the above product.

Also when the product containing sodium caseinate was compared with the protein free product after 30 seconds of mastication by viewing the masticated samples under a light microscope it was clear that the former product had broken down more completely than the protein free product.

Conductivity measurements and also the measurement of the average water droplet size by means of NMR unambiguously showed that the low fat spread was a water-in-oil dispersion.

EXAMPLE 2

A 40% fat spread was prepared from an aqueous phase and fat phase having the same composition as given in Example 1, with the exception that instead of 1 wt. % sodium alginate 10.0 wt. % maltodextrin (Paselli SA2) was used.

The product obtained was in all respects very similar to the product described in Example 1.

Conductivity measurements and also the measurement of the average water droplet size by means of NMR unambiguously showed that the low fat spread was a water-in-oil dispersion.

I claim:

1. A plastic dispersion containing from 5 to 65 wt. % of a continuous fat phase comprising: a vegetable fat and a dispersed aqueous phase having from 95 to 35 wt. % of a polysaccharide agar present in a concentration exceeding a critical gelling concentration of the agar, the aqueous phase comprising from 0.04 to 0.3 wt. % of a protein selected from the group consisting of a dairy protein, a vegetable protein or mixtures thereof, and a viscosity enhancer selected from the group consisting of guar gum, non-gelling maltodextrin, sodium alginate, xanthan gum, locust bean gum and tragacanth, the viscosity enhancer present in a concentration below the critical gelling concentration thereof and the plastic dispersion being essentially free of gelatin.

2. The plastic dispersion according to claim 1 wherein the protein is present in an amount of 0.04 to 0.15 wt. %.

3. The plastic dispersion according to claim 1 wherein the agar is present in an amount of 0.5 to 5% by weight.

4. The plastic dispersion according the claim 1 wherein the fat is present in an amount of 28 to 65 wt. %.

5. The plastic dispersion according to claim 4 wherein the fat is present in an amount of 5 to 28 wt. %.

6. The plastic dispersion according to claim 1 wherein conductivity of the dispersion in the mouth is measured as a function of time and 60% of the conductivity increase is observed within 10 to 25 seconds.

* * * * *